United States Patent [19]
Jennings et al.

[11] 3,832,021
[45] Aug. 27, 1974

[54] NECK SEAL

[75] Inventors: Lewis C. Jennings, Boylston; Samuel S. Rickley, West Boylston, both of Mass.

[73] Assignee: Morgan Construction Company, Worcester, Mass.

[22] Filed: Nov. 16, 1972

[21] Appl. No.: 307,155

[52] U.S. Cl.................. 308/36.1, 277/58, 277/70
[51] Int. Cl............................................. F16j 15/40
[58] Field of Search............ 277/58, 17, 56, 67, 70; 308/36.1

[56] References Cited
UNITED STATES PATENTS

| | | | |
|---|---|---|---|
| 2,868,574 | 1/1959 | Rich, Jr. | 277/152 X |
| 3,093,425 | 6/1963 | Rich, Jr. | 308/36.1 |
| 3,330,567 | 7/1967 | Mercer et al. | 277/235 X |

Primary Examiner—Samuel B. Rothberg
Attorney, Agent, or Firm—Thompson, Birch, Gauthier & Samuels

[57] ABSTRACT

In a machine having a bearing-supported rotary element, a bearing seal for preventing each of two different fluids used in the operation of the machine from contaminating one another.

10 Claims, 3 Drawing Figures

NECK SEAL

BACKGROUND OF THE INVENTION

The invention will hereinafter be described in connection with bearings for rolls in a rolling mill. It will be understood, however, that this association of the invention with a particular type of bearing or industrial application is employed herein only for illustrative purposes, and is not intended nor should it be construed as a limitation upon the scope of the invention. As the description proceeds, it will become evident that the invention has broad applicability wherever machines have bearing-supported rotary elements, with bearing seals for preventing each of two different fluids used in the operation of the machine from contaminating one another.

The rolls in rolling mills are customarily mounted on journal or rolling element bearings. The journal type bearing, usually in the form of an oil film bearing, customarily comprises a roll sleeve which fits on the tapered or cylindrical roll neck and has an outer cylindrical bearing surface. This outer surface fits closely within a corresponding cylindrical interior surface of a fixed bushing which bushing is mounted in the roll chock. Lubricant, usually oil, is presented or forced under pressure in flooding quantity into the small cylindrical space between the roll sleeve and the fixed bushing. The oil as it is expelled from the ends of the bearings surfaces if collected in a sump and by suitable pumping means is continuously re-used. At the same time, the rolls and the work passing therethrough are flooded with a coolant fluid which flows downward over the rolls. This coolant likewise is collected and re-used. It is essential, therefore, that the coolant fluid be kept from intermingling with the bearing oil and conversely the oil should be kept from contaminating the coolant. Neck seals for achieving this result have been developed over the years and some examples may be found in the patents to Rich, U.S. Pat. No. 2,868,574; Rich, U.S. Pat. No. 3,093,425 and Mercer et al., U.S. Pat. No. 3,330,567.

In all of the prior art constructions of labyrinth seals of this type, there are circular flexible elements rotating with the roll which engage, in sliding relation, circular portions of a fixed intermediate end plate in which the oil is on one side of the plate and the coolant fluid is on the other. The flexible sealing elements are designed to prevent the oil and coolant fluid from reaching each other, thus to avoid contamination.

While the seals of the prior art have been, in large measure, effective, still the sliding engaging portions are subject to wear and on occasion oil and coolant fluid have worked their way past the seals to cause mutual contamination.

SUMMARY OF THE PRESENT INVENTION

The present invention, usable with any type of rolling mill bearing or with any other construction in which there are relatively rotating parts in which two different adjacent fluids must be prevented from mingling, constitutes an improvement on that type of seal shown for example in the patent to Mercer et al., U.S. Pat. No. 3,330,567 in that additional means is provided for preventing oil or coolant fluid that may work past the sliding seals from mingling with the other. This result is achieved by modifying the configuration of the intermediate fixed end plate and the adjacent rotating baffles so that it becomes more difficult for the oil and the coolant fluid to reach the sliding seal elements in the first place. Then through the provision of additional drains which will drain off any oil or coolant fluid that passes the sliding sealing surfaces it becomes possible to prevent the accumulation of cooling fluid or oil which, were it not for the newly incorporated drains, would in time accumulate and pass the interior periphery of the seal end plate to cause contamination of the oil or fluid on the other side of the plate.

The invention also includes means for monitoring the quantity of the coolant fluid and/or oil draining away from the seal while the mill is in operation so that if any leakage is occurring, it will be observed and the seal can be repaired at the next opportunity. Since all leakage is being carried away, there will be no contamination of the bearing or coolant fluid, and hence damage to the bearing or to the mill product will be avoided.

DESCRIPTION OF A PREFERRED EMBODIMENT

Figure 1:
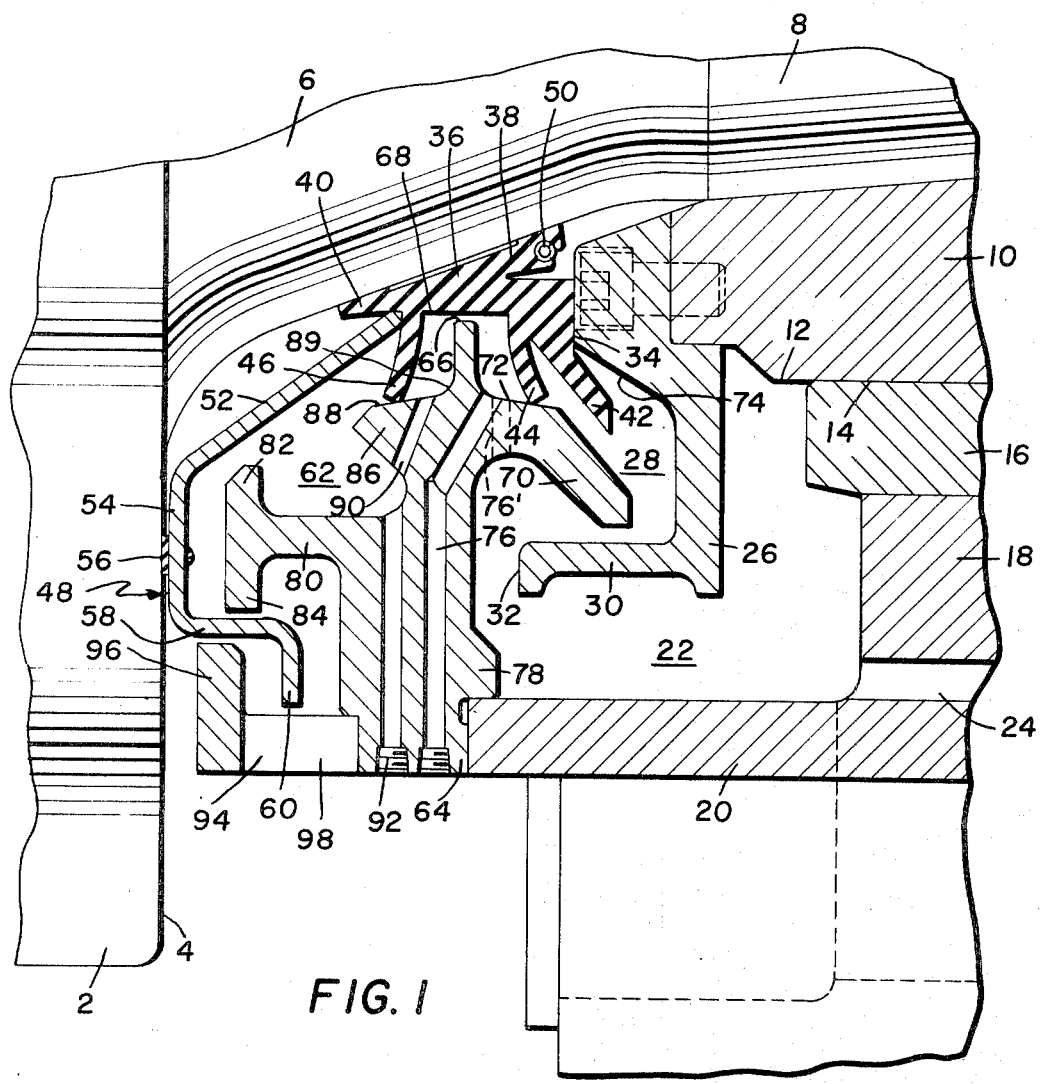
FIG. 1 is a vertical fragmentary section taken through the oil film bearing structure and the neck seal at the bottom of the roll and roll neck.

Referring first to FIG. 1, a roll is shown at 2 having an end face 4 and a roll neck 6. The tapered end 8 of the roll neck 6 has mounted thereon a roll sleeve 10 having an outer cylindrical bearing surface 12. This outer surface 12 engages a cylindrical interior bearing surface 14 of a fixed bushing 16 which is carried by a roll chock 18. The roll sleeve 10 rotates with the roll while the roll chock 18 and the fixed bushing 16 are stationary. Oil in flooding quantity is fed continuously between the bearing surface 12 and 14. A circular extension 20 of the roll chock provides at its bottom portion a sump 22 in which the oil emerging from the bearing is continuously collected. The oil may be drawn away from the sump through a suitable piping connection 24 to be recycled through the reservoir and pumped back to the bearing surfaces.

Coolant fluid is constantly flooding over the roll 2 and down over the end face 4 and in spite of the centrifugal throw-off tends to work its way along the roll neck in the direction of the bearing. The object of the constructions of the previously referred to patents and of this present construction is to prevent any of the coolant fluid from reaching and contaminating the bearing oil and, vice versa, preventing the oil from contaminating the coolant fluid.

One construction of the present invention that achieves this result will now be described. Referring to FIG. 1, the inner end of roll sleeve 10 has affixed thereto a rigid, circular baffle 26 which may be said to be generally in the form of a torus with its concave side facing the end of the roll. The exact cross-sectional configuration of baffle 26 may be varied from that shown in the drawing provided that there is a substantial concavity 28 with an overhanging portion 30 large enough to minimize the quantity of oil that might work its way around the end 32 while the roll is in operation.

The inner circular part 34 of baffle 26 is in pressing engagement with one end of a neck seal 36 which surrounds the roll neck 6 in a fluid tight engagement. Neck seals are made of rubber-like material such as neoprene so that they can be forced into tight engagement with the roll neck.

The neck seal includes circular end portions 38 and 40 which when in position on the roll neck are well stretched to make tight sealing engagement. The neck seal also has flingers 42, 44 and 46. An inner seal ring 48 of conventional form engages the neck seal 36 at the juncture of portion 40 and flinger 46 thereby acting in conjunction with end 34 of baffle 26 to hold the neck seal 36 tightly in position on the roll neck 6. A garter spring 50 applies additional inward circumferential pressure on portion 38.

Inner seal ring 48 consists of a conical inner part 52, an annular part 54 which engages the end face 4 through a series of interposed angularly separated spacers 56, and a generally cylindrical part 58 terminating in a radial flange 60. The inner seal ring is also generally in the form of a torus with its concavity 62 facing the concavity 28 of baffle 26.

Extension 20 has affixed to its end a circular seal end plate 64 of novel construction. Its inner periphery 66 is closely adjacent the circular exterior surface 68 of neck seal 36. A circular flange 70 extends into the concavity 28. The interior surface 72 is engaged by flinger 44 while flinger 42 is in the space between flange 70 and the wall 74 of baffle 26. One or more drains 76, commencing inwardly of flinger 44, extend through the lower portions of the flange 70 and continue to the exterior of the unit through the relatively thick circular outer part 78 of seal end plate 64 whereby any oil discharged through drain 76 may be monitored while the mill is in operation.

Alternatively, the drain 76 may be replaced by a drain 76' shown in dotted lines leading directly back to sump 22. This is a less desirable arrangement for monitoring any flow of oil but is equally effective in draining oil from the area inward of flinger 44.

A circular flange 80 extends into the concavity 62 in the same general way that flange 70 extends into concavity 28. Flange 80 has at its end, inner and outer radial baffles 82 and 84. Between flange 80 and inner edge 66 of seal end plate 64 is a smaller flange 86 on whose inner circular surface 88 rests flinger 46. One or more drains 90 extend from a position inwardly of flinger 46 through the flange 86.

One or more drains 92 paralleling drains 76 also extend through the lower part of seal end plate 64 running from the interior of flange 80 to an exterior position where the drain 92 may be connected with a drain pipe (not shown).

The seal end plate 64 carries an additional circular seal outer ring 94 having an inturned flange 96. A large drain 98 is at the bottom of member 94.

It will be noted that flange 96 and radial baffle 84, both stationary, are closely adjacent the rotating circular part 58 of inner seal ring 48. Likewise, the end of stationary flange 70 is well inside the circular part 30 of baffle 26.

The operation of the construction of FIG. 1 will now be explained. During operation of the mill, oil is constantly being expelled from the ends of the bearing surfaces 12 and 14. Some of the oil will fall by gravity or run down the stationary walls of the fixed parts into the sump 22. The rest of the expelled oil collecting on the rotating parts will be thrown therefrom by centrifugal force likewise to collect in the sump 22. However, some small part of the oil will creep along the fixed and rotating walls to reach the stationary flange 70 and the rotating inner wall of concavity 28. Ultimately some oil may work its way along the interior surface of flange 70 to reach the position of engagement of flinger 44 with flange 70. Ordinarily because of the shape of the parts coupled with the always present centrifugal force, oil is not likely to pass flinger 44. However, experience has shown that sometimes oil does pass flinger 44 and in time could accumulate to an extent to compel the oil to pass over the interior periphery 66 of plate 64. By the present construction, if any oil does get by flinger 44, then it will flow by gravity to the lower part of flange 70 and thence out through the drain 76 or through the drain 76' back into sump 22.

In summary then, the improved construction of FIG. 1 provides a labyrinth that makes it more difficult for the oil to reach the flinger 44 that provides the basic seal and should oil work by the basic seal, then additional means in the form of drains 76 or 76' removes the intruding oil thereby to preclude passage of oil to the other side of end plate 64. Oil flow through drain 76 can be monitored from a position exterior of the bearing while the mill is in operation, thus providing an indication of how well the seal is functioning.

Now turning to the operation of the cooling fluid side of the neck seal of FIG. 1, the operation is as follows. The fluid flooding down over the end of the roll is for the most part thrown off by centrifugal force. Most of any fluid passing flange 96 will be thrown off by radial flange 60 to flow down along the circular wall of outer seal ring 94 to be discharged through drain 98.

If any of the coolant fluid works its way to the inner concave side of inner seal ring 48 and gets by the radial baffles 84 and 82 of large flange 80, then it will collect at the bottom of flange 80 to drain away through drain 92.

If any coolant fluid gets on the inner side 88 of flange 86 to reach and pass the basic sliding seal provided by flinger 46 then such fluid will flow down the stationary inner wall 89 of flange 86 to drain through drain 90 and thence out through drain 92.

Thus, the provision of a first interior drain 92 causes substantially all of the small amount of coolant fluid that may have worked its way past flange 80 to be discharged without reaching the flinger 46. Then if any small residue should reach flinger 46 and pass thereby because of defective sealing engagement between flange 86 and flinger 46, such residue will escape first through drain 90 and thence through drain 92. In this way, there can be no build up of coolant fluid in the space to the left of interior edge 66, and as previously explained, there can be no build up of oil in the space to the right of interior edge 66. Therefore, mixing of coolant fluid with oil or oil with coolant fluid is prevented.

The separate drain 92 further provides a means of monitoring any failure of the seal on the cooling fluid side, as does the drain 76 on the oil side. Since all effluent is drained away, contamination of one fluid with another is prevented and the "monitoring" feature enables early changing or repair of faulty seals at a convenient time before damage to the bearing components and/or the product being rolled can occur.

Figure 2:
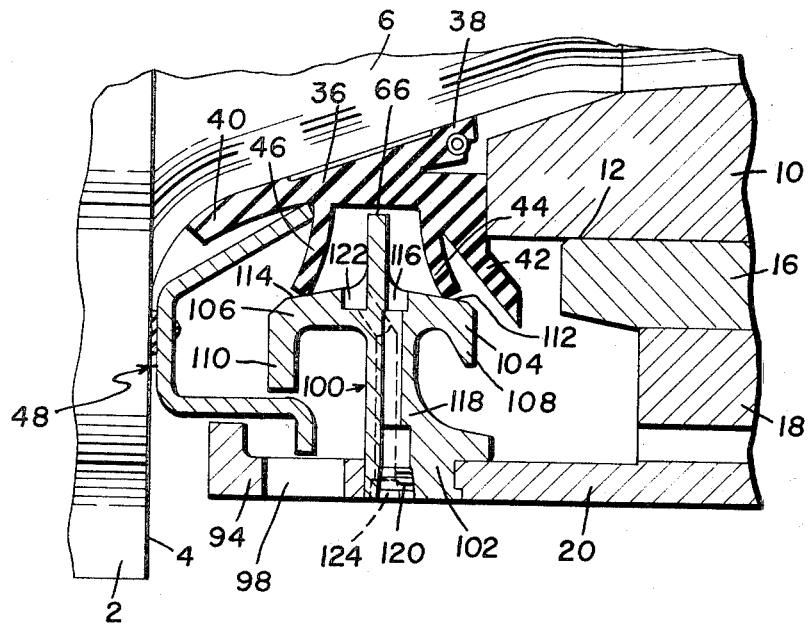
FIG. 2 shows a modified form of the intermediate fixed end plate and the related drains.

A modified form of seal end plate is shown in FIG. 2. This plate which is indicated generally at 100 may be submitted in the construction of FIG. 1 for the seal end plate 64. Additionally, the plate 100 has been formed to be effective without the inclusion of baffle 26.

Seal end plate 100 includes an outer circular portion 102 which is attached to extension 20 on the right and carries seal outer ring 94 on the left. Flange 104 is in general similar to flange 70 of FIG. 1 but flange 106 differs from flange 80 of FIG. 1 in that there is no intermediate coolant fluid collecting area.

Flange 104 has a rim 108 and flange 106 has a rim 110. The flinger 44 slidingly engages the inner surface 112 of flange 104 and the flinger 46 slidingly engages the inner surface 114 of flange 106. Inwardly of flinger 44 is a drain 116 which extends downwardly through the thickened body 118 whereby any oil getting by flinger 44 may be drawn off and observed or monitored at the outlet 120. Inwardly of flinger 46 is a drain 122 which also extends downwardly through the body 118 independently of drain 116 whereby coolant fluid that may have passed flinger 46 may be drawn off and observed or monitored at the outlet 124.

The operation of the construction of FIG. 2 is the same as the operation of the seal end plate 64 of FIG. 1. Oil passing flinger 44 and coolant fluid passing flinger 46 will be drained away before contamination of one with the other can occur, and any draining can be monitored to determine if and when the seal should be repaired or replaced. The shapes of the flanges 108 and 110 are such that it is difficult for the oil and the coolant fluid to reach their respective sealing flingers 44 and 46.

Figure 3:
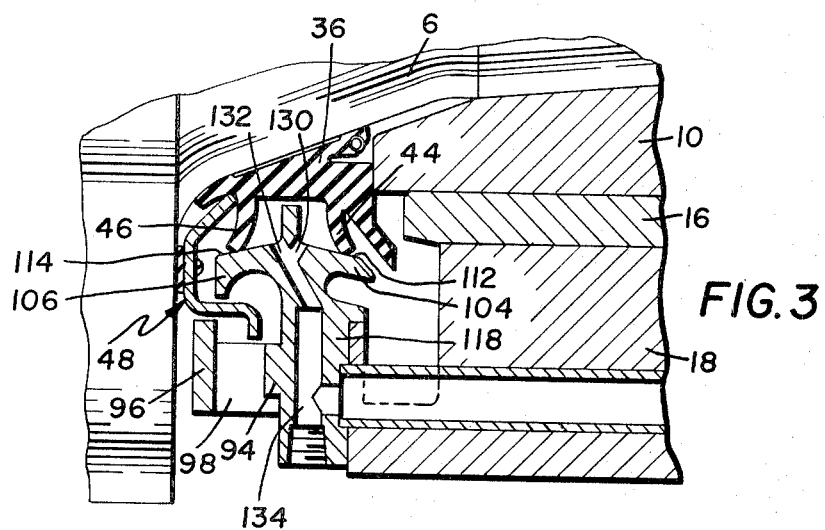
FIG. 3 shows a further modification of the intermediate fixed end plate in which the drains lead to a common discharge.

The modification shown in FIG. 3 in which most of the parts have been numbered to agree with FIGS. 1 and 2 is modified in the following manner. The drains 130 and 132 lead to a common outlet 134. This arrangement precludes independent monitoring of leakage at flinger 44 or flinger 46. However, if any significant volume of fluid is drained off, it is sufficient indication that the neck seal 36 should be replaced and the cooperating surfaces 112 and 114 of the flanges 104 and 106 should be inspected for irregularities.

It is intended to cover all changes and modifications of the examples of the invention herein chosen for the purposes of the disclosure which do not constitute departures from the spirit and scope of the invention.

We claim:

1. In a machine having a rotary element supported in a bearing, a bearing seal for preventing each of two different fluids used in the operation of the machine from contaminating the other, said bearing seal comprising:

a neck seal mounted in fluid tight engagement on said rotary element;

an annular seal end plate attached to the stationary part of said bearing and extending radially inward with the inner periphery of its inner part adjacent said neck seal;

a first circular flange on one side of said seal end plate;

a second circular flange on the other side of said seal end plate;

first and second fixed circular surfaces on the said flanges on opposite sides of the said inner part of said seal end plate;

first and second circular flingers attached to and extending away from said neck and slidingly engaging said first and second circular surfaces respectively;

a first drain in said first circular flange, said first drain having an inlet located between said inner part of said seal end plate and said first flinger;

and a second drain in said second circular flange, said second drain having an inlet located between said inner part of said seal end plate and said second flinger, each of said drains leading to a discharge outlet at the exterior of the bearing.

2. The construction set forth in claim 1 wherein the said drains are independent of each other, with each drain leading to a separate outlet at the exterior of the bearing, whereby the fluids passing each flinger may be independently observed at said outlets.

3. The construction set forth in claim 1 wherein the said drains lead to a common outlet at the exterior of the bearing.

4. The construction set forth in claim 1 wherein the outlets associated with said drains are located in the lower part of the body of said seal end plate.

5. The construction set forth in claim 1, and first and second generally torus shaped baffles mounted on the rotary element with their concave sides facing each other and the said first and second circular flanges extending within the respective concave areas of said torus shaped baffles.

6. The construction set forth in claim 1 wherein said first drain is interrupted at a location intermediate its inlet and outlet, whereby fluid from a source other than the inlet of said first drain can also enter said first drain.

7. In a machine having a bearing supporting rotary element, a bearing seal for preventing each of two different fluids used in the operation of the machine from contaminating the other, said bearing seal comprising first and second generally torus shaped baffles mounted on said rotary element between the end of the rotary element and the said bearing with their concave sides facing each other;

a neck seal mounted in fluid tight engagement on said rotary element between said torus shaped baffles;

an annular seal end plate attached to the stationary part of said bearing and extending radially inward between said torus shaped baffles with the inner periphery of its inner part adjacent said neck seal;

a first circular flange on one side of said seal end plate extending within the concave space of said first torus shaped baffle;

a second circular flange on the other side of said seal end plate extending into the concave space of said second torus shaped baffle;

first and second fixed circular surfaces on the said flanges on opposite sides of the said inner part of said seal end plate;

first and second circular flingers attached to and extending away from said neck seal and slidingly engaging said first and second circular surfaces respectively;

a first drain in said first circular flange, said first drain commencing between said inner part of said seal end plate and said first flinger;

and a second drain in said second circular flange, said second drain commencing between said inner part of said seal end plate and said second flinger, each said drain associated with a passage leading to an exterior discharge position whereby samples of fluid passing through said drains may be collected for testing.

8. The construction set forth in claim 7, there being another larger circular flange on the same side as said first circular flange, the passage associated with said first drain also being associated with the area between said first flange and said other larger flange.

9. The construction set forth in claim 7, and a third flinger extending from said neck seal between said second circular flange and said second torus shaped baffle.

10. The construction set forth in claim 7, said second flange being of increasing diameter in the direction away from said first flange.

* * * * *